(12) United States Patent
Marks et al.

(10) Patent No.: US 8,268,166 B2
(45) Date of Patent: Sep. 18, 2012

(54) PROTEIN SKIMMER

(75) Inventors: Neil H. Marks, Ra'anana (IL); Sharon Ram, Rehovot (IL)

(73) Assignee: Red Sea Fish Pharm Ltd., Herzliya (IL)

( * ) Notice: Subject to any disclaimer, the term of this patent is extended or adjusted under 35 U.S.C. 154(b) by 487 days.

(21) Appl. No.: 12/450,731

(22) PCT Filed: Apr. 16, 2008

(86) PCT No.: PCT/IL2008/000520
§ 371 (c)(1),
(2), (4) Date: Oct. 9, 2009

(87) PCT Pub. No.: WO2008/126091
PCT Pub. Date: Oct. 23, 2008

(65) Prior Publication Data
US 2010/0051520 A1    Mar. 4, 2010

(30) Foreign Application Priority Data

Apr. 17, 2007 (IL) .......................................... 182603
Feb. 14, 2008 (IL) .......................................... 189538

(51) Int. Cl.
*A01K 63/04* (2006.01)
(52) U.S. Cl. ...... 210/95; 210/143; 210/151; 210/167.25; 210/167.26; 210/221.2; 210/538; 119/263; 119/264
(58) Field of Classification Search .................... 210/94, 210/95, 97, 134, 137, 143, 151, 167.21, 167.25, 210/167.26, 167.31, 169, 221.2, 519, 538, 210/540, 194; 119/259–264
See application file for complete search history.

(56) References Cited

U.S. PATENT DOCUMENTS

| | | | |
|---|---|---|---|
| 3,525,437 A | 8/1970 | Kaeding et al. |
| 3,965,007 A | 6/1976 | Conn et al. |
| 3,994,811 A | 11/1976 | Cohen et al. |
| 4,033,719 A | 7/1977 | Conn et al. |
| 4,512,885 A | 4/1985 | Willinger |
| 4,602,996 A | 7/1986 | Willinger |
| D291,720 S | 9/1987 | Willinger et al. |
| 4,764,311 A | 8/1988 | Klaes |

(Continued)

FOREIGN PATENT DOCUMENTS
DE    44 16 587 C1    8/1995
(Continued)

*Primary Examiner* — Joseph Drodge
(74) *Attorney, Agent, or Firm* — Abraham Hershkovitz; Harold L. Novick; Hershkovitz & Associates, LLC

(57) ABSTRACT

Protein skimmers having an upright housing including an open topped body with a manually removable foam collection cup for sealing mounting on the body. The foam collection cups encircle a foam collection duct except for a recessed inspection window for exposing an area of the foam collection duct's exterior surface for enabling an aquarist a generally horizontal line of sight to continuously inspect the foam collection duct's interior. The protein skimmers have a canister-like configuration with a front control panel including a main inlet, a main outlet and at least one aspirating pump for circulating an air/water mixture. The protein skimmers include a disperser for dispersing an incoming flow of organic loaded water peripherally downward into a reaction chamber in a substantially uniform manner. The protein skimmers include a washing mechanism for periodically washing their foam collection ducts without having to remove their foam collection cups.

46 Claims, 15 Drawing Sheets

U.S. PATENT DOCUMENTS

| | | | |
|---|---|---|---|
| 4,834,872 | A | 5/1989 | Overath |
| 4,997,559 | A | 3/1991 | Ellis et al. |
| 5,006,230 | A | 4/1991 | Votava, III et al. |
| 5,078,867 | A | 1/1992 | Danner |
| 5,098,585 | A | 3/1992 | Woltman et al. |
| 5,282,962 | A | 2/1994 | Chen |
| 5,380,160 | A | 1/1995 | Chen |
| 5,385,665 | A | 1/1995 | Neuhaus |
| 5,484,525 | A * | 1/1996 | Mowka, Jr. .............. 210/167.26 |
| D368,297 | S | 3/1996 | Dunlap |
| 5,522,987 | A | 6/1996 | Bresolin |
| 5,554,280 | A | 9/1996 | Loehr |
| 5,562,821 | A | 10/1996 | Gutierrez-Collazo |
| 5,665,227 | A | 9/1997 | Watt |
| 5,728,293 | A | 3/1998 | Guoli et al. |
| 5,736,034 | A | 4/1998 | Phillips et al. |
| 5,776,335 | A | 7/1998 | Overath |
| 5,800,704 | A | 9/1998 | Hansen |
| 6,054,045 | A | 4/2000 | Wittstock et al. |
| D428,469 | S | 7/2000 | Roig |
| 6,156,209 | A | 12/2000 | Kim |
| 6,303,028 | B1 | 10/2001 | Marks et al. |
| D451,580 | S | 12/2001 | Marks et al. |
| 6,436,295 | B2 | 8/2002 | Kim |
| 6,808,625 | B1 | 10/2004 | Wu |
| 7,029,577 | B2 * | 4/2006 | Cummins ................ 210/167.31 |
| 7,121,535 | B2 | 10/2006 | Curlee et al. |
| 7,264,714 | B2 | 9/2007 | Joneid |
| 7,309,443 | B2 | 12/2007 | Kelty |
| 7,316,776 | B2 | 1/2008 | Kieselbach |
| 7,445,706 | B2 | 11/2008 | Liu |
| 2003/0201232 | A1 | 10/2003 | Cheyne |
| 2004/0164011 | A1 | 8/2004 | Geudtner |
| 2005/0183998 | A1 | 8/2005 | Joneid |
| 2006/0065987 | A1 | 3/2006 | Schletz |
| 2006/0180532 | A1* | 8/2006 | Cummins ..................... 210/169 |
| 2007/0069403 | A1 | 3/2007 | Schletz et al. |
| 2007/0193956 | A1* | 8/2007 | Nelson ........................ 210/703 |
| 2007/0278144 | A1* | 12/2007 | Wong ........................ 210/221.2 |

FOREIGN PATENT DOCUMENTS

| | | |
|---|---|---|
| DE | 198 25 162 A1 | 4/2000 |
| DE | 203 19 867 U1 | 3/2004 |
| DE | 10 2004 062 519 | 7/2006 |
| JP | 2003-304774 | 10/2003 |
| WO | WO 2004/017724 | 3/2004 |
| WO | WO 2004/017726 | 3/2004 |

* cited by examiner

PROTEIN SKIMMER

CROSS REFERENCE TO RELATED APPLICATIONS

This application is the U.S. National Application of PCT application Serial Number PCT/IL2008/000520 filed on 16 Apr. 2008 in the English language and designating the United States, the entire contents of which are incorporated herein by reference.

FIELD OF THE INVENTION

The invention pertains to protein skimmers for use in aquariums.

BACKGROUND OF THE INVENTION

Protein skimmers assist in maintaining a controlled aquatic environment in aquariums and employ naturally occurring foam fractionation to produce organic loaded foam containing organic waste material extracted from organic loaded water. Protein skimmers are typically formed from transparent rigid plastic material and include an upright reaction chamber for producing organic loaded foam, a foam collection cup for collecting organic loaded foam, and a lid. The organic loaded foam is produced by a vigorous mixture of air bubbles and the incoming organic loaded water. Small protein skimmers include a main inlet for injecting an air/organic loaded water mixture into a reaction chamber and a main outlet for supplying organic free water. Injection of organic loaded water into a reaction chamber often introduces vigorous turbulence which hinders foam fractionation. Some protein skimmers include one or more aspirating pumps for circulating an air/water mixture within a reaction chamber to create micro air bubbles for facilitating foam fractionation. Protein skimmers generally have large footprints and are typically inconveniently positioned for maintenance purposes either within or besides a sump, or at the rear of or within an aquarium.

Foam collection cups encircle a generally cylindrical foam collection duct in flow communication with a reaction chamber to collect organic loaded foam rising up same and spilling thereover. Organic loaded foam lines a foam collection duct's interior surface thereby progressively hindering foam fractionation which is detrimental to an aquarium's aquatic environment. Aquarists periodically inspect protein skimmers to determine the extent of lining and whether the foam collection ducts require cleaning to restore full operational capability. Aquarists are unable to inspect a foam collection duct's interior along a horizontal line of sight due to organic loaded foam in its encircling foam collection cup and also lining its interior surface. Thus, aquarists necessarily have to remove a protein skimmer's lid and inspect a foam collection duct's interior from above. Periodic cleaning of a foam collection cup requires interrupting operation of a protein skimmer and removal of the foam collection cup which is inconvenient and time consuming.

Exemplary protein skimmers for use in aquariums are illustrated and described in inter alia U.S. Pat. No. 3,965,007 to Conn et al., U.S. Pat. No. 3,994,811 to Cohen et al, U.S. Pat. No. 4,834,872 to Overath, U.S. Pat. No. 4,988,436 to Cole, U.S. Pat. No. 5,084,164 to Del Rosario, U.S. Pat. No. 5,282,962 to Chen, U.S. Pat. No. 5,484,525 to Mowka, Jr., U.S. Pat. No. 5,554,280 to Loehr, U.S. Pat. No. 5,562,821 to Gutierrez-Callazo, U.S. Pat. No. 5,665,227 to Watt, U.S. Pat. No. 5,736,034 to Phillips et al, U.S. Pat. No. 5,776,335 to Overath, U.S. Pat. No. 5,800,704 to Hansen, U.S. Pat. No. 6,156,209 to Kim, commonly owned U.S. Pat. No. 6,303,028 to Marks et al., U.S. Pat. No. 6,436,295 to Kim, and U.S. Pat. No. 6,808,625 to Wu.

Product information regarding protein skimmers commercially available from Applicants Red Sea Fish Pharm Ltd, Herzliya, Israel, is available online at www.redseafish.com.

SUMMARY OF THE INVENTION

The present invention is directed towards protein skimmers having an upright housing including an open topped body and a manually removable foam collection cup for sealing mounting on the body. The protein skimmers preferably have a canister-like configuration with a front control panel including an inlet, an outlet and at least one aspirating pump for circulating an air/water mixture, thereby reducing footprint and facilitating deployment either within or besides a sump or at the rear of or within an aquarium. The protein skimmers preferably include a disperser for dispersing an incoming flow of organic loaded water peripherally downward into a reaction chamber in a substantially uniform manner thereby preventing vigorous turbulence in the reaction chamber which affects foam fractionation. The protein skimmers preferably include a washing mechanism for periodically washing their foam collection ducts without having to remove their foam collection cups. The protein skimmers include a three way control valve having one setting for disabling an incoming flow of organic loaded water, a second setting for enabling an incoming flow of organic loaded water for foam fractionation purposes, and a third setting for diverting the incoming flow of organic loaded water to the washing mechanism. This arrangement beneficially enables the same source of organic loaded water to either undergo foam fractionation or be used for washing the foam collection ducts. The foam collection cups preferably include a recessed inspection window for enabling a generally horizontal line of sight to enable an aquarist to continuously inspect the foam collection duct's interior thereby assisting him to regulate protein skimmer operation more accurately and conveniently determine whether he needs to clean a foam collection cup to return a protein skimmer to its full operational capability. Small protein skimmers generally intended for external or internal hanging on aquariums can be modified to include an inspection window.

BRIEF DESCRIPTION OF THE DRAWINGS

In order to understand the invention and to see how it can be carried out in practice, preferred embodiments will now be described, by way of non-limiting examples only, with reference to the accompanying drawings in which similar parts are likewise numbered, and in which.

DETAILED DESCRIPTION OF PREFERRED EMBODIMENTS OF THE PRESENT INVENTION

Figure 1:
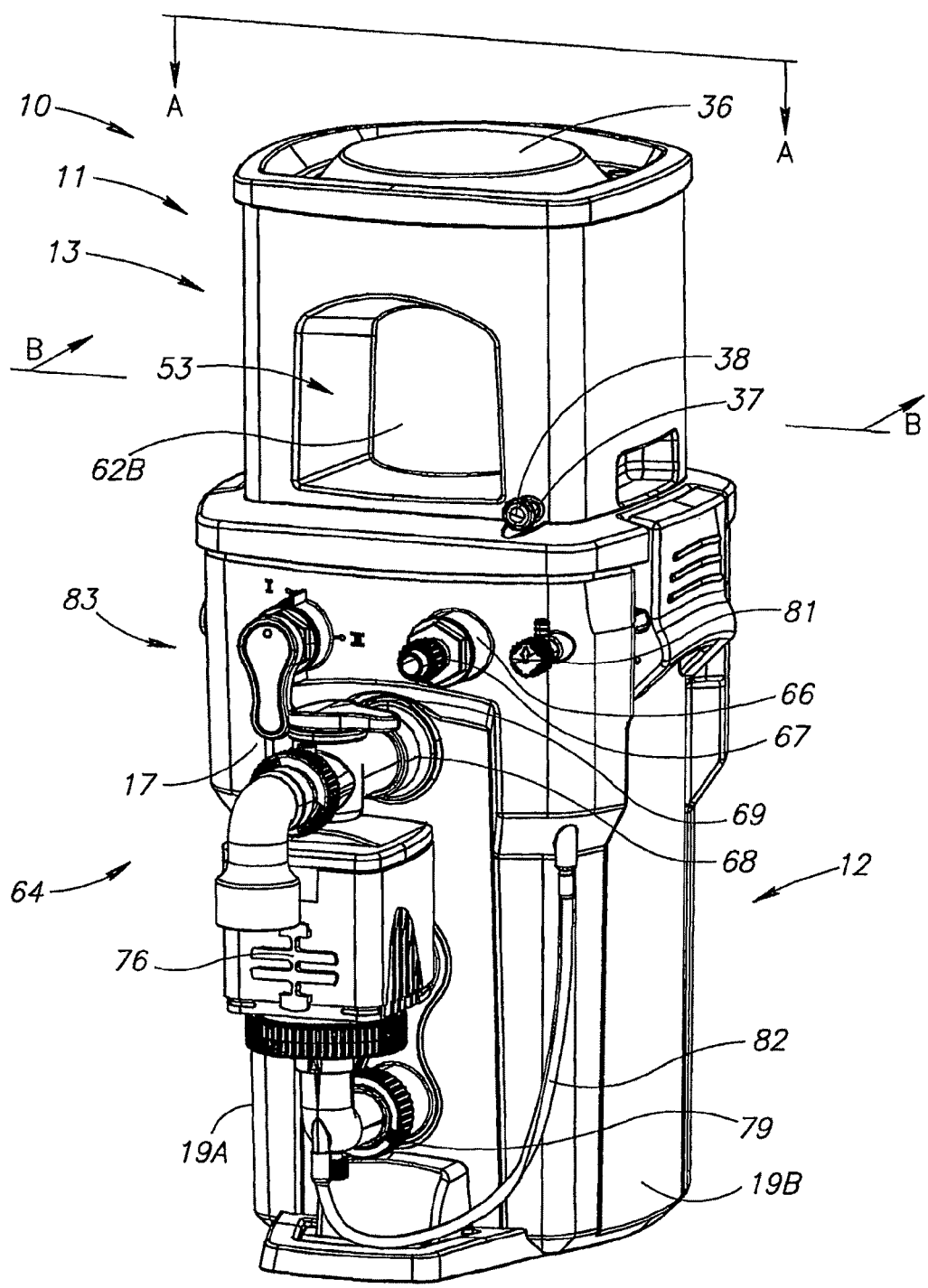
FIG. 1 is a front perspective view of a canister-like protein skimmer including a body having a front control panel with a manually operated control valve, a foam collection cup with a foam collection duct and an inspection window, and a washing mechanism for periodically washing the foam collection duct's interior surface in accordance with the present invention.
Figure 2:
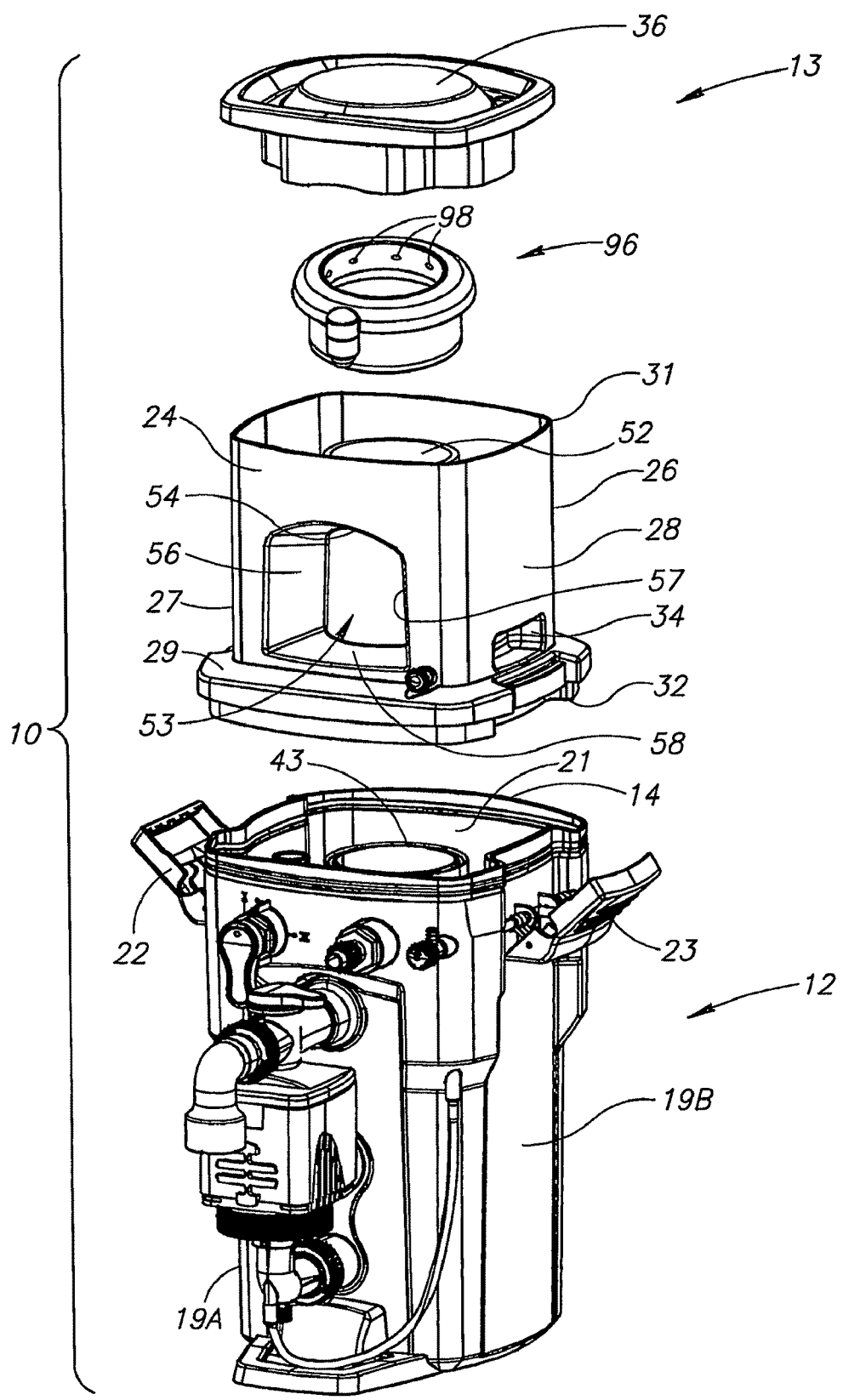
FIG. 2 is a front perspective view of the protein skimmer in a dissembled state.
Figure 3:
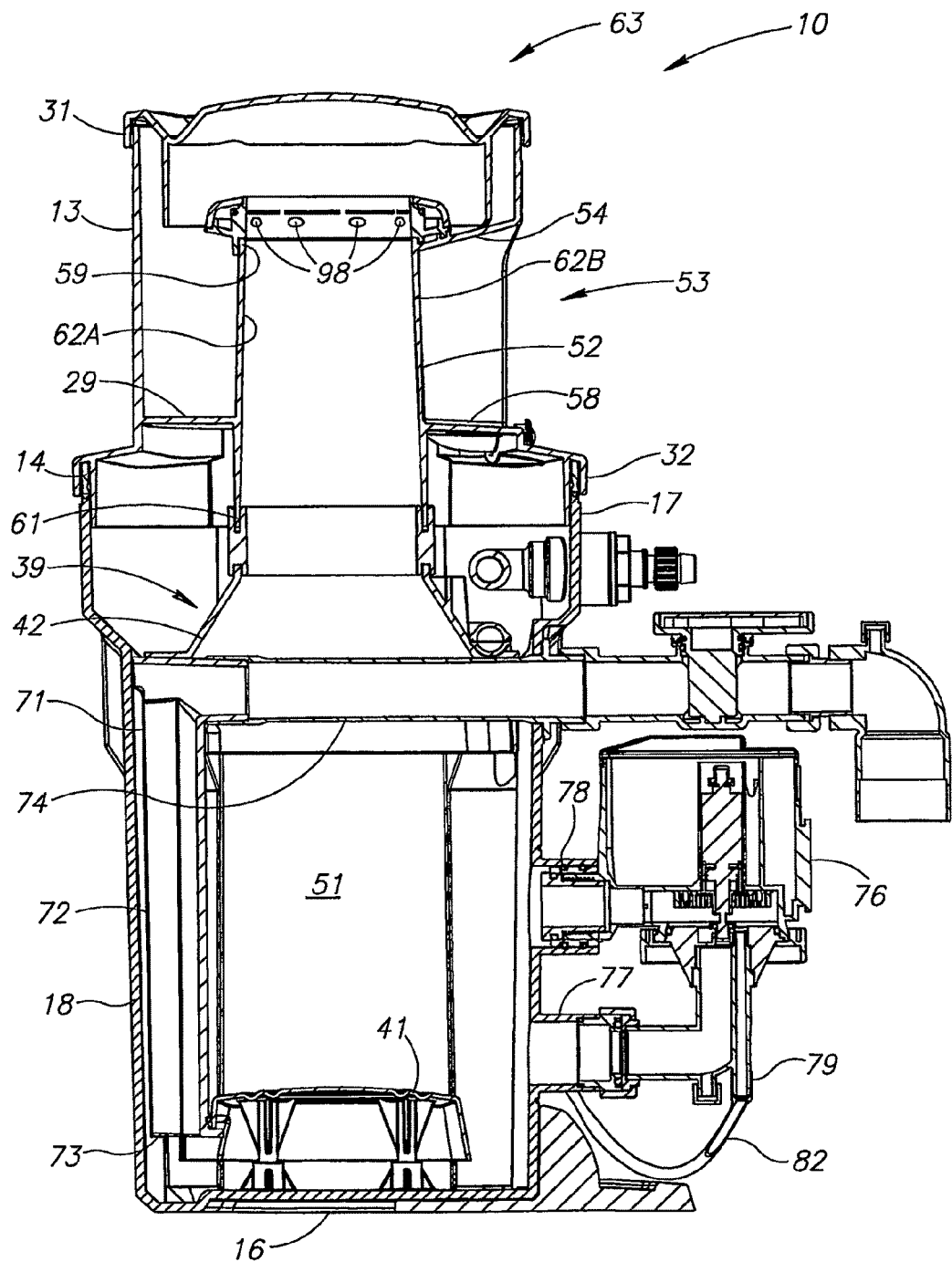
FIG. 3 is a longitudinal cross section along line A-A in FIG. 1.

FIGS. 1 to 3 show a canister-like protein skimmer 10 for deployment within or besides a sump. The protein skimmer 10 has an upright housing 11 with an open topped body 12 and a manually removable foam collection cup 13 for sealing mounting on the body 12. The body 12 has an uppermost rim 14, a bottom surface 16, and opposite front and rear surfaces 17 and 18 and opposite left and right side surfaces 19A and 19B. The body 12 has an inside surface 21 and a generally rectangular transverse cross section and preferably a generally square transverse cross section. The protein skimmer 10 includes a pair of latches 22 and 23 mounted on the side surface 19 for securing the foam collection cup 13 on the body 12. Alternative securing arrangements include a bayonet fitting, and the like.

The foam collection cup 13 has opposite front and rear surfaces 24 and 26, opposite left and right side surfaces 27 and 28, and a horizontal base surface 29. The front and rear surfaces 24 and 26 and left and right side surfaces 27 and 28 have an uppermost rim 31 and a lowermost rim 32 beneath the base surface 29. The opposite left and right side surfaces 27 and 28 are formed with handles 33 and 34 for assisting an aquarist to remove the foam collection cup 13 from the body 12. A foam collection lid 36 seals the foam collection cup 13. The front surface 24 is formed with a drainage hose barb 37 for draining foam from the foam collection cup 13. The drainage hose barb 37 is sealable by a manually removable plug 38.

Figure 4:
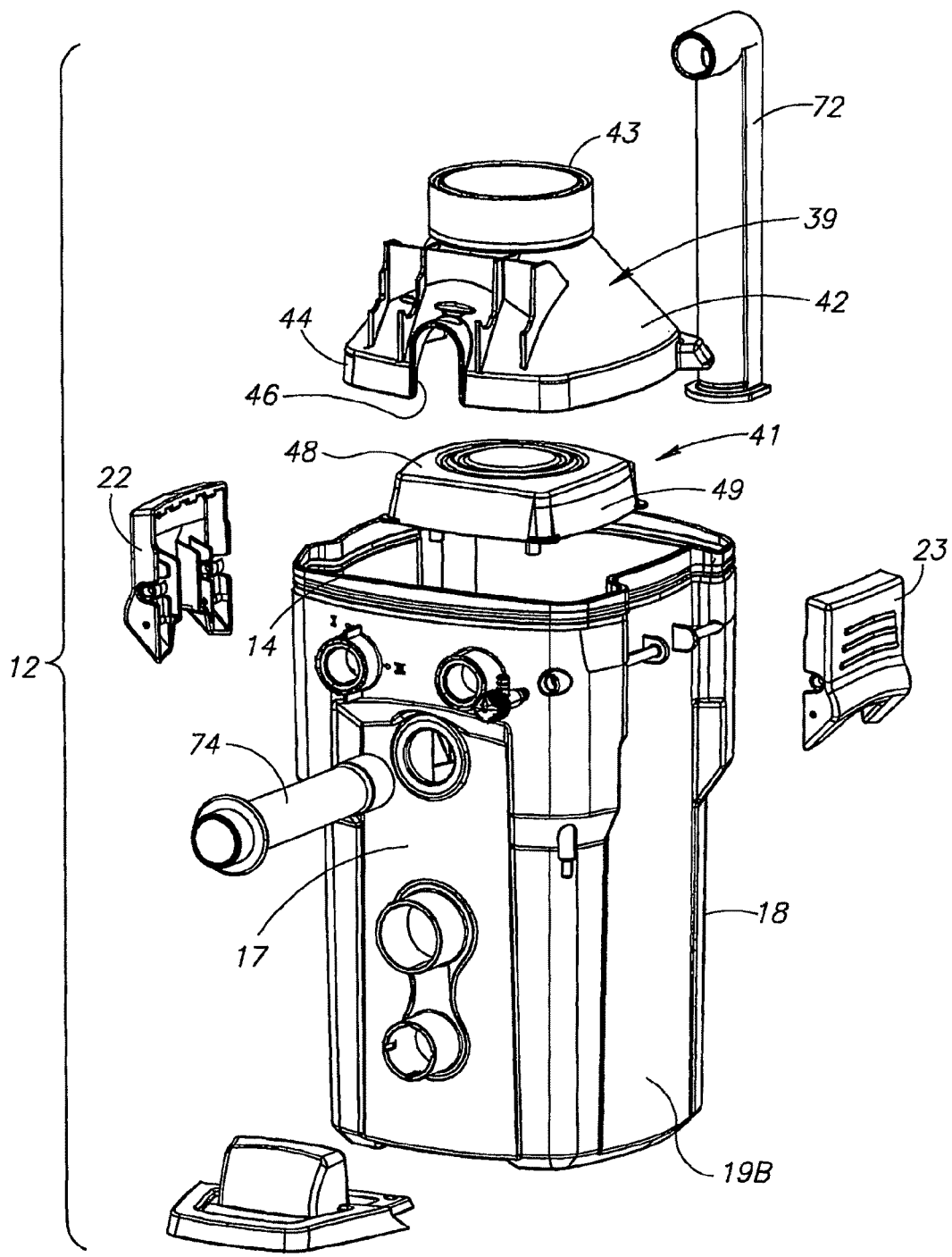
FIG. 4 is an exploded view of the body.
Figure 5:
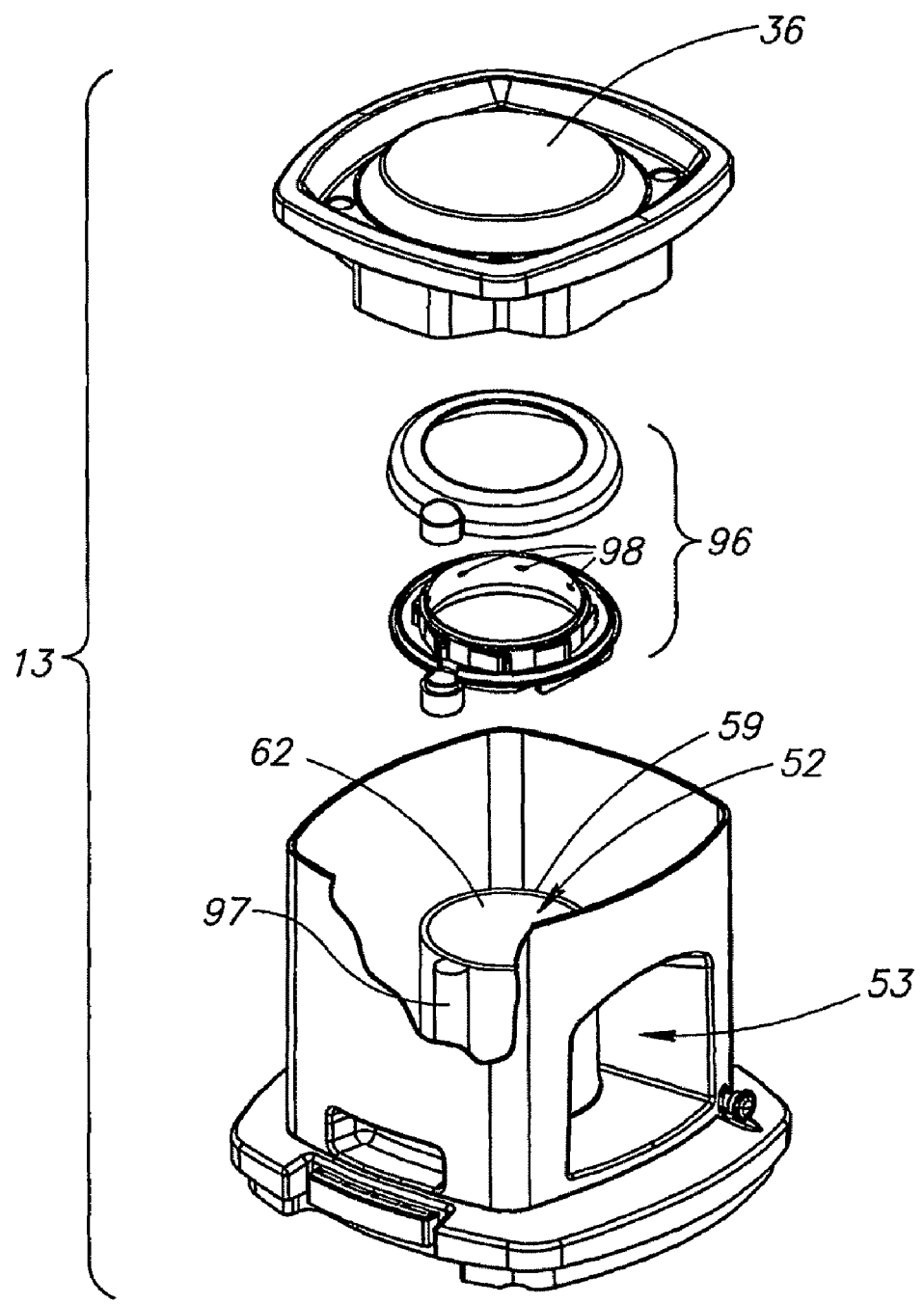
FIG. 5 is an exploded view of the foam collection cup.
Figure 6:
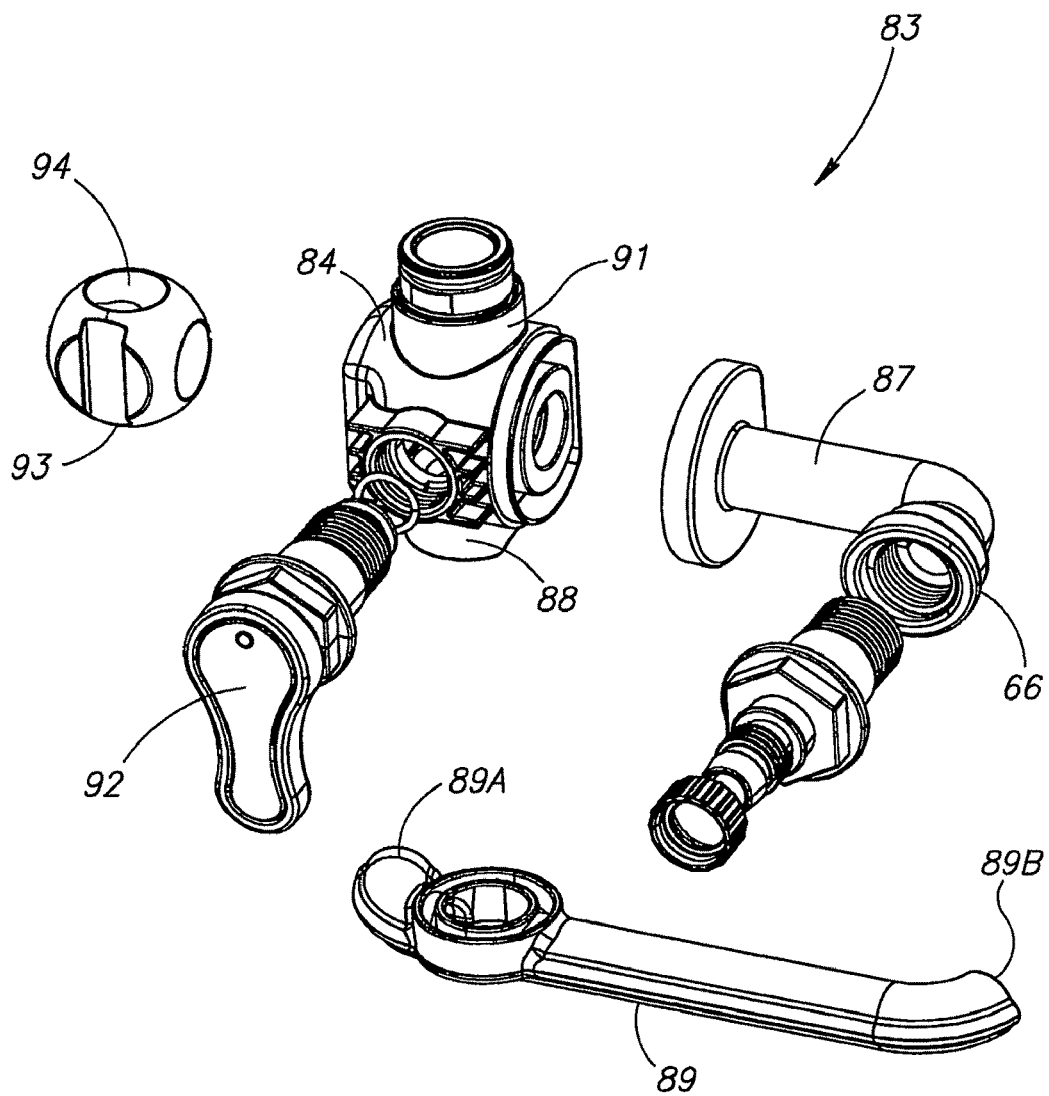
FIG. 6 is an exploded view of the control valve.
Figure 7:
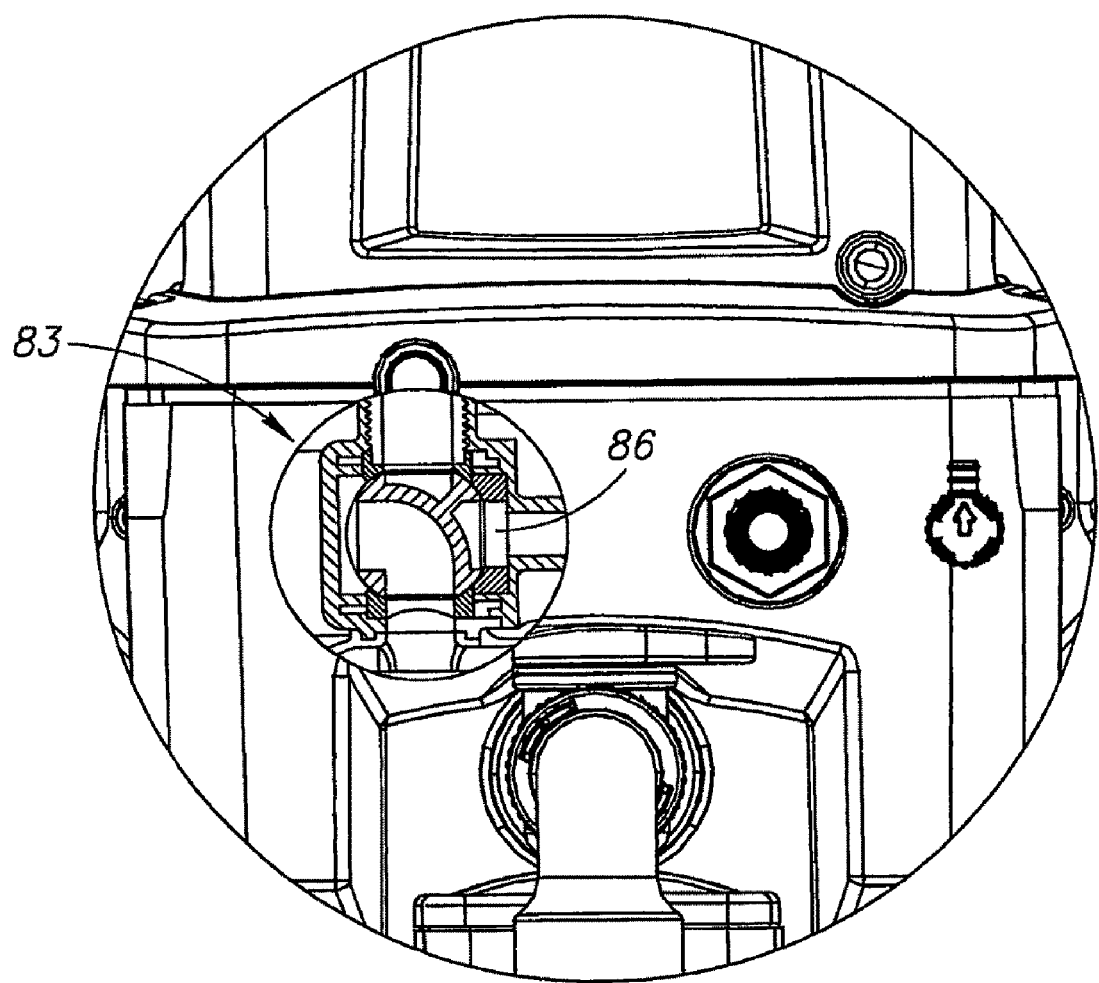
FIG. 7 is a fragmentary internal view of the protein skimmer for showing the control valve in its OFF control position for disabling an incoming flow of organic loaded water.
Figure 8:
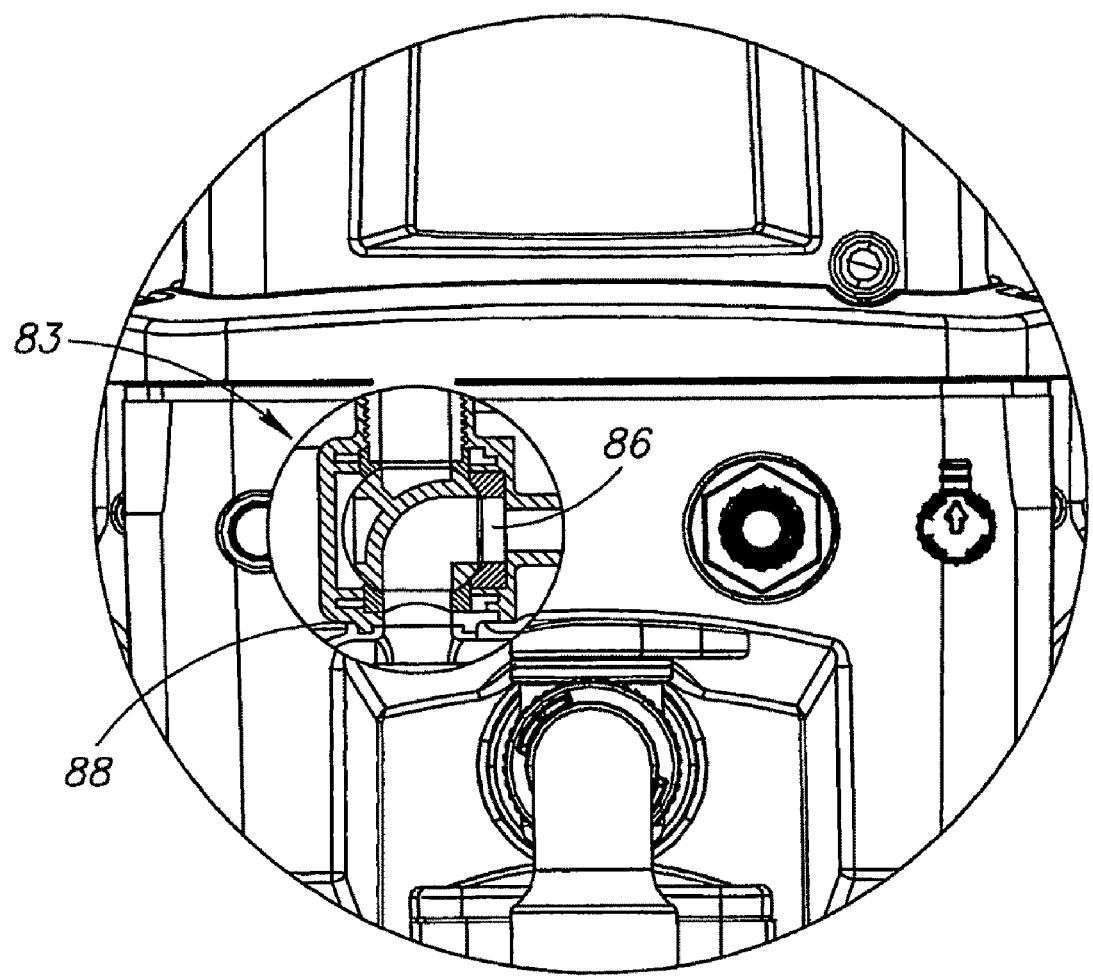
FIG. 8 is a fragmentary internal view of the protein skimmer for showing the control valve in its SKIM control position for enabling an incoming flow of organic loaded water.
Figure 9:
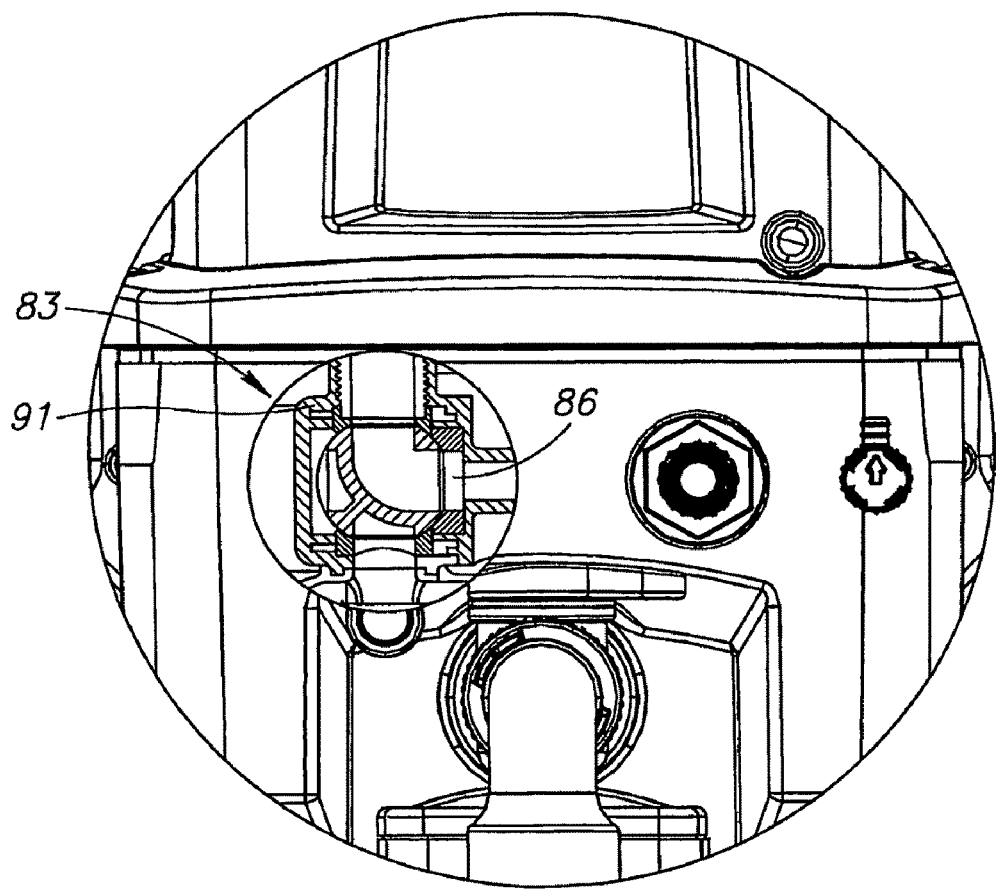
FIG. 9 is a fragmentary internal view of the protein skimmer for showing the control valve in its WASH control position for washing the foam collection duct's interior surface.

FIGS. 3 and 4 show the body 12 accommodates a disperser 39 deployed beneath the uppermost rim 14 and a stand 41 standing on the bottom surface 16. The disperser 39 has a hollow upwardly converging surround 42 with an uppermost central circular throat 43 deployed below the uppermost rim 14 and a lowermost generally square rim 44 spaced apart from the inside surface 21. The lowermost rim 44 has aligned central front and rear cutouts 46 and 47 (not shown). The stand 41 has a top surface 48 and a generally square peripheral surface 49 spaced apart from the inside surface 21. The dispenser 39 and the stand 41 define a reaction chamber 51 for foam fractionation of organic loaded water.

Figure 10:
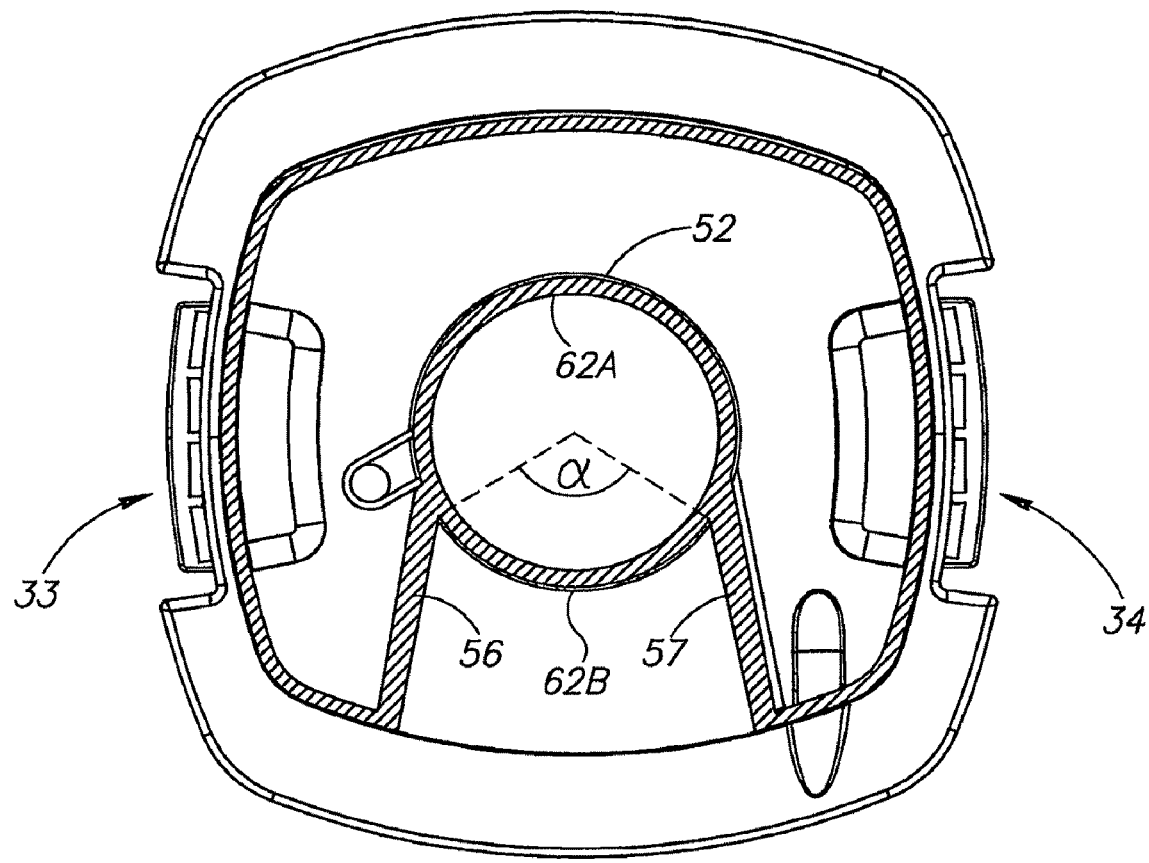
FIG. 10 is a transverse cross section of the foam collection cup along line B-B in FIG. 1.
Figure 11:
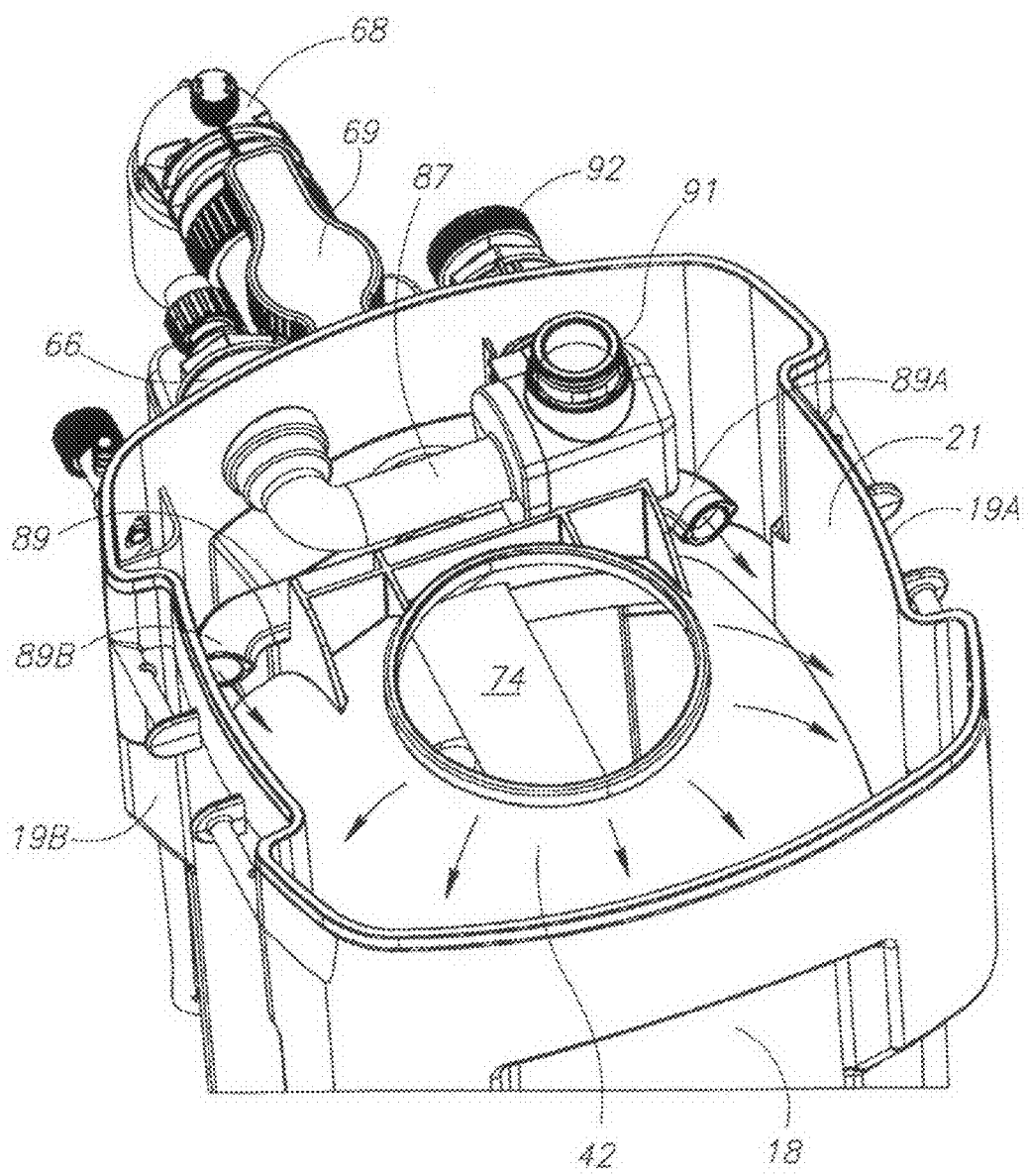
FIG. 11 is a pictorial view showing the use of a disperser for peripherally dispersing an incoming flow of organic loaded water into a reaction chamber.
Figure 12:
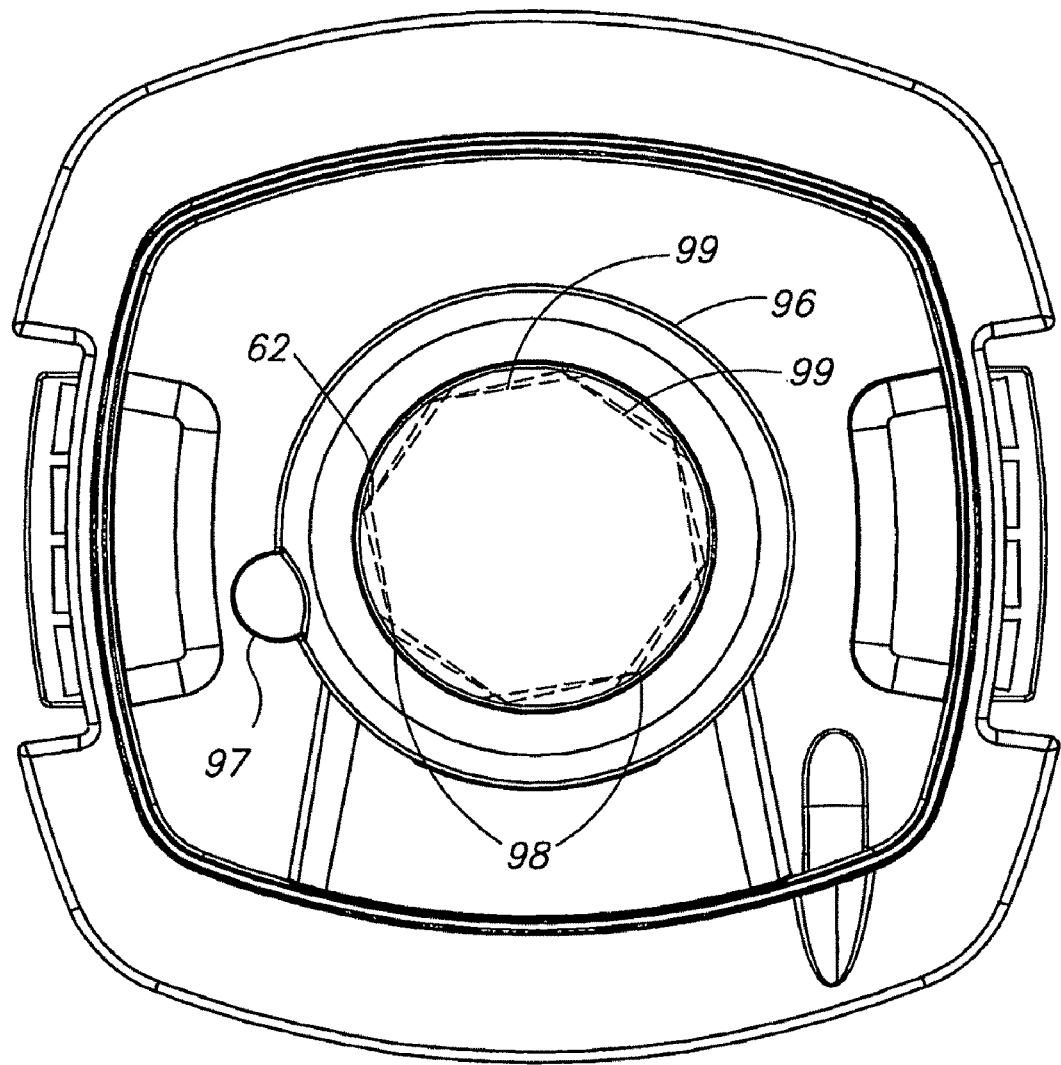
FIG. 12 is a top view of the foam collection cup showing the operation of the washing mechanism for cleaning the foam collection duct's interior surface.
Figure 13:
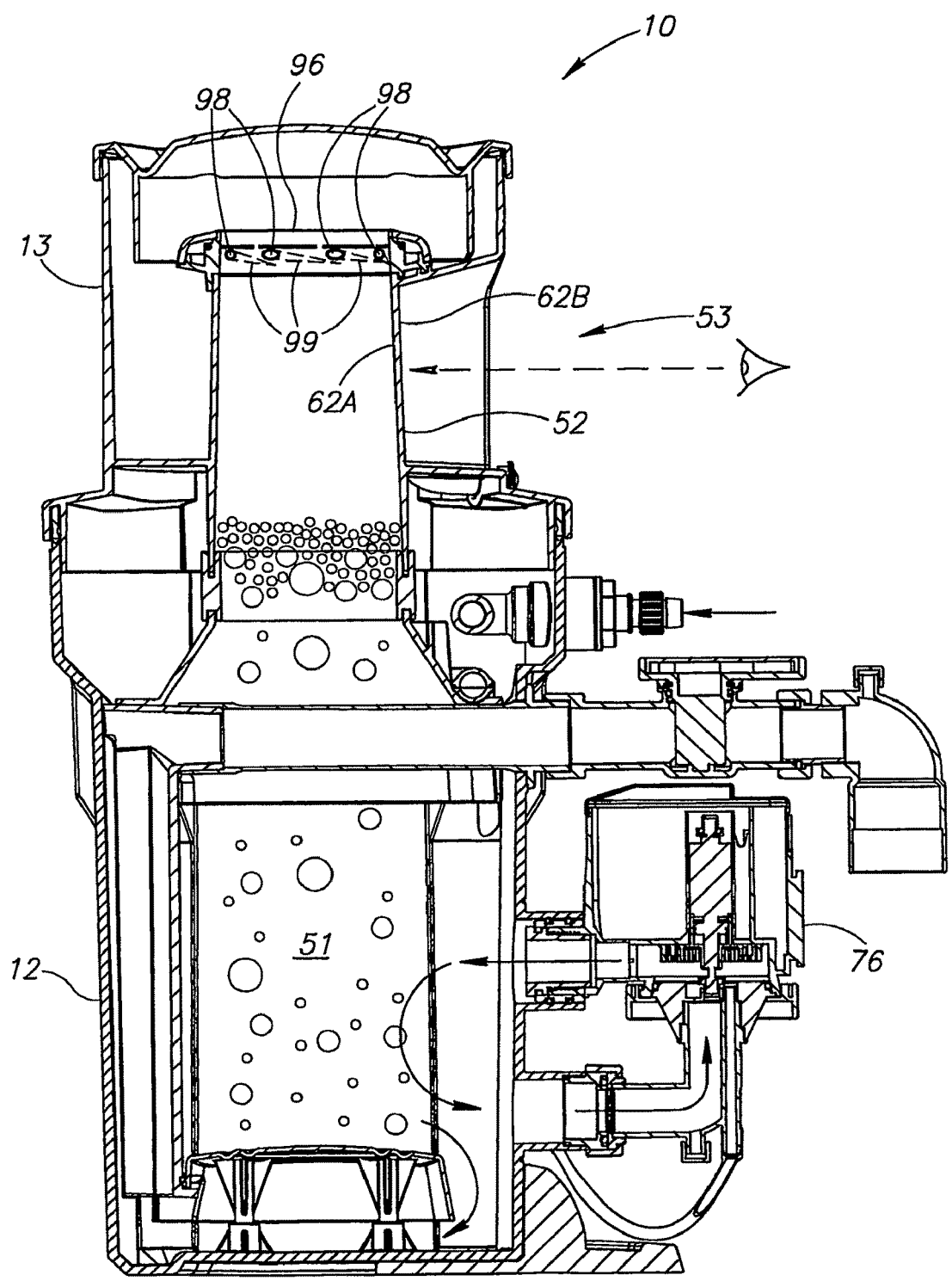
FIG. 13 a longitudinal cross section of the protein skimmer showing the operation of the washing mechanism for cleaning the foam collection duct's interior surface.
Figure 14:
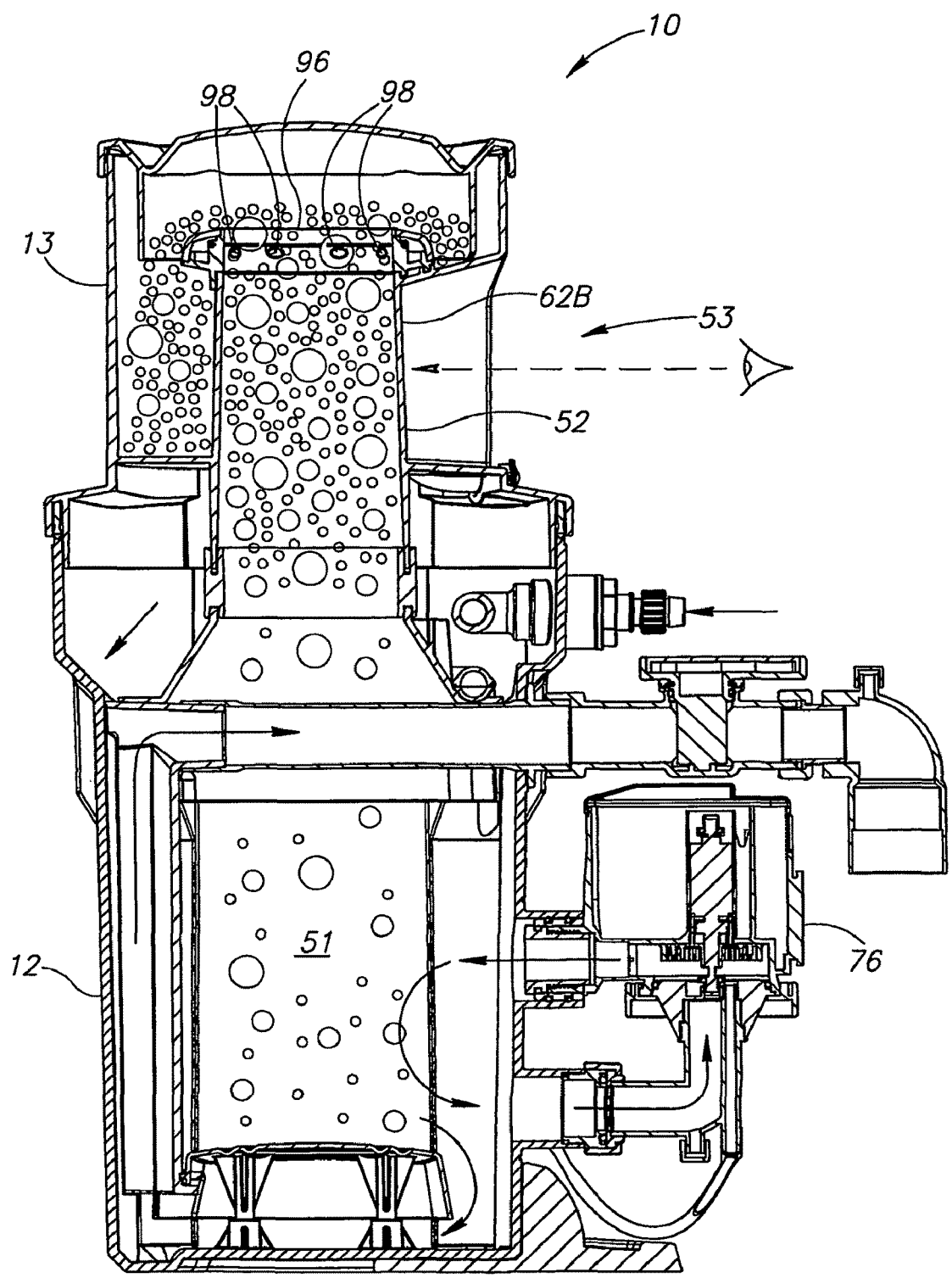
FIG. 14 is a longitudinal cross section of the protein skimmer in operation for affording a generally horizontal view of its foam collection duct's interior.

The foam collection cup 13 encircles a generally cylindrical foam collection duct 52 except for a recessed inspection window 53 having a substantially horizontal top wall 54, a pair of opposite vertical side walls 56 and 57, and a bottom wall 58 forming part of the base surface 29. The foam collection duct 52 has an uppermost rim 59 beneath the uppermost rim 31 and above the top wall 54, and a lowermost rim 61 beneath the lowermost rim 32 for sealingly mounting on the throat 43 on mounting the foam collection cup 13 on the body 12 whereby the foam collection duct 52 is in flow communication with the reaction chamber 51. The foam collection duct 52 has an interior surface 62A which becomes lined with organic residues during operation of the protein skimmer 10 and an exterior surface 62B. The inspection window 53 exposes at least a quarter of the foam collection duct's exterior surface 62B as indicated by an internal angle $\alpha$ L>90° (see FIG. 10) in a generally horizontal line of sight for enabling an aquarist to conveniently inspect the foam collection duct's interior. The foam collection cup 13 includes a washing mechanism 63 for washing foam residues off the interior surface 62A whereupon they slide down back toward the reaction chamber 51.

The front surface 17 includes a control panel 64 with an inlet 66 fitted with an inlet pipe hose barb 67 for sealing flow communication with a main pump (not shown) providing an incoming flow of organic loaded water and a central outlet pipe 68 for providing a supply of organic free water. The outlet pipe 68 is fitted with an outlet flow regulator 69 for regulating the supply of organic free water. The outlet pipe 68 is fed with organic free water from under the stand 42 via a right angled exit tube 71 with an upright section 72 deployed against the rear surface 18 and an inlet port 73 beneath the stand 42, and a horizontal section 74 passing through the central front and rear cutouts 46 and 47. The control panel 64 includes an aspirating pump 76 with an inlet port 77 for drawing water from the reaction chamber 51 and an outlet port 78 for returning an air/water mixture above the inlet port 77 to the reaction chamber 51. The aspirating pump 76 has an air inlet 79 connected to an air valve 81 adjacent the inlet pipe hose barb 67 via an air pipe 82.

The control panel 64 includes a manually operated three position control valve 83 having an OFF control position indicated I for disabling a flow of organic loaded water into the reaction chamber 51, a SKIM control position indicated II for enabling a flow of organic loaded water into the reaction chamber 51 for skimming purposes, and a WASH control position indicated III for directing an incoming flow of organic loaded water to the washing mechanism 63. The control valve 83 includes a valve housing 84 with an inlet port 86 in permanent flow communication with the inlet 66 via a horizontal inlet pipe 87, a downward facing outlet port 88 for injecting organic loaded water above the disperser 39 via a horizontal pipe 89 having a pair of outlet ports 89A and 89B respectively adjacent the side surfaces 19A and 19B, and an upward facing outlet port 91 for injecting organic loaded water into the washing mechanism 63. The control valve 83 includes a control handle 92 for rotating a ball shaped valve member 93 in the valve housing 84 through 180° for setting the three control positions. The valve member 93 seals the inlet port 86 in the OFF control position and includes a L-shaped lumen 94 for correspondingly connecting the inlet port 86 to the outlet port 88 in the WASH control position and the outlet port 91 in the SKIM control position.

FIGS. 2, 5, 12 and 13 show the washing mechanism 63 includes an annular spray ring 96 removably mounted on the uppermost rim 59 and an external vertical pipe 97 for connecting the outlet port 91 to the annular spray ring 96 on mounting the foam collection cap 13 on the body 12. The spray ring 96 includes a plurality of spray holes 98 for spraying chord-like water jets 99 towards their neighboring spray holes 98 in a clockwise direction for cleaning the foam collection duct's interior surface 62A. The water jets 99 set up a downwardly spiraling flow of organic loaded water for cleaning the foam collection duct's interior surface 62A such that its organic lining is washed down towards the reaction chamber 51.

The operation of the protein skimmer 10 is as follows:

An aquarist sets the control valve 83 to its SKIM control position for injecting organic loaded water into the body 12 above the disperser 39 whereupon the organic loaded water flows downward between the disperser's lowermost rim 44 and the insider surface 21 in a substantially uniform manner into the reaction chamber 51. The aspirating pump 76 recirculates air/water mixture in the reaction chamber 51 to introduce microscopic air bubbles to assist foam fractionation. An annular air pocket builds up above the disperser 39 which acts as a pre-oxygenating chamber and urges the incoming flow of organic loaded water into the reaction chamber 51. Foam fractionation takes place within the upper region of the reaction chamber 51 and foam rises up the foam collection duct 52. Organic loaded foam spills over the annular spray ring 96 into the foam collection cup 13. Organic loaded foam spilling over the annular spray ring 96 in the region of the inspection window 53 slides down onto its top wall 54 and into the foam collection cup 13 on either side of the inspection window 53. Organic free water peripherally flows downward between the stand 41 and the inside surface 21 in a generally uniform manner into the exit pipe 71 to exit through the outlet pipe 68. The aquarist can control the flow of organic free water by regulating the outlet flow regulator 69. The aquarist can regulate foam fractionation by regulating the air valve 81 to control air intake into the aspirating pump 76.

The aquarist can readily inspect the flow collection duct's interior along a generally horizontal line of sight to determine foam production and whether it requires cleaning. In the affirmative, the aquarist sets the control valve 83 to the WASH control position thereby diverting the incoming flow of organic loaded water from being foam fractionated in the reaction chamber 51 to the washing mechanism 63. The washing mechanism 63 sprays jets of water onto opposite regions of the foam collection duct's interior surface 62A whereupon the sprayed water together with the removed foam residues slide down back into the reaction chamber 51. The aquarist may detect that operation of the washing mechanism 63 is insufficient to clean the foam collection duct's interior surface 62A whereupon he sets the control valve 83 to the OFF control position. The aquarist can manually remove the foam collection cup 13 from the body 12 for cleaning purposes without having to stop operation of the main pump pumping the supply of organic loaded water to the protein skimmer 10.

Figure 15:
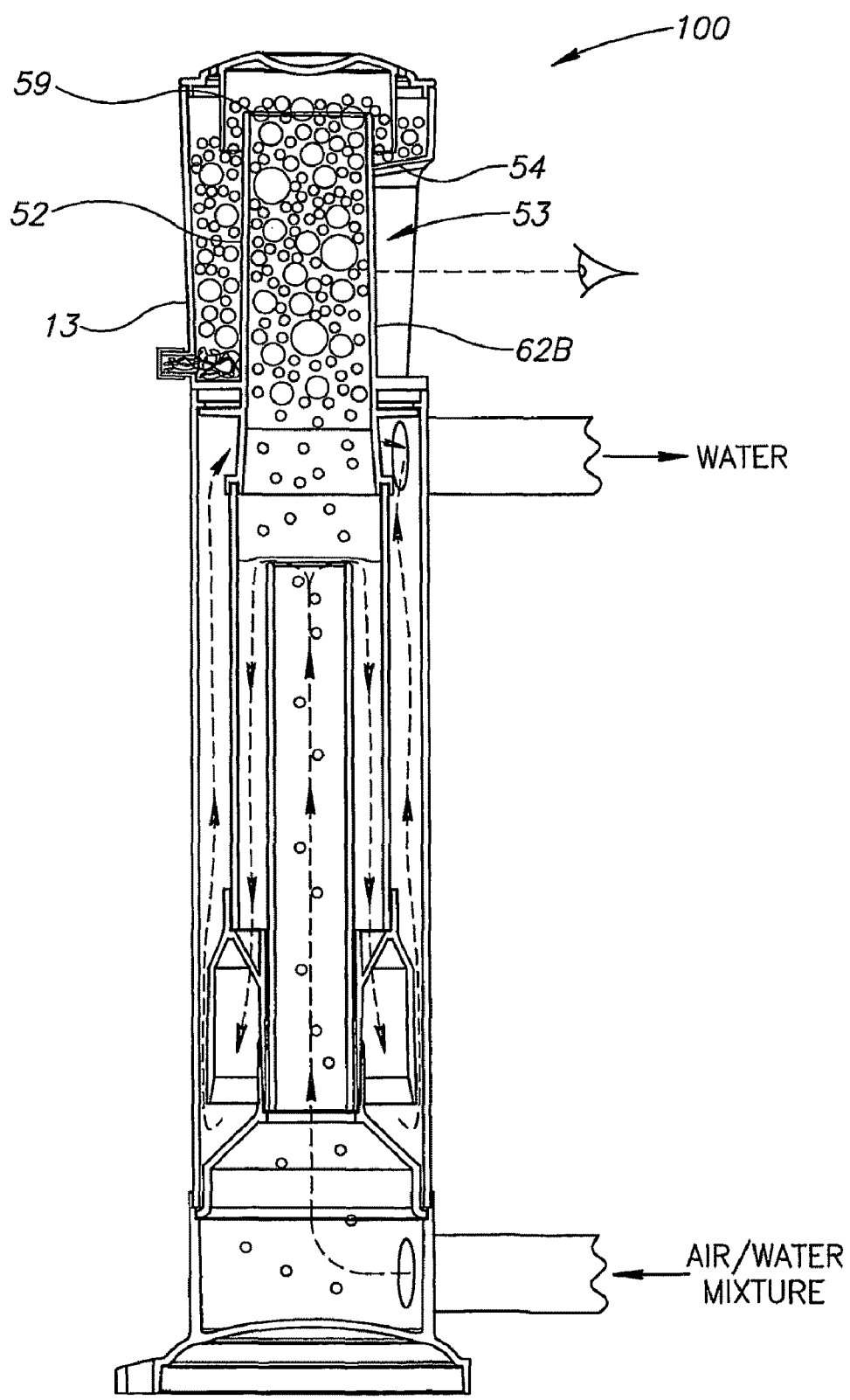
FIG. 15 is a longitudinal cross section showing the operation of an alternative embodiment of a protein skimmer including an inspection window in accordance with the present invention.

FIG. 15 shows a protein skimmer 100 for hanging externally or internally on an aquarium. The protein skimmer 100 is similar in construction and operation to the protein skimmer 10 and therefore similar parts are likewise numbered. The protein skimmer 100 includes a foam collection cup 13 including a foam collection duct 52 with a rim 59 and a recessed inspection window 53. Organic loaded foam occupies the foam collection duct 52 and spills over its rim 59 into the foam collection cup 13. Organic loaded foam spilling over the rim 59 in the region of the inspection window 53 slides down onto its top wall 54 into the foam collection cup 13 on either side of the inspection window 53. An aquarist can readily inspect the flow collection duct's interior along a generally horizontal line of sight to regulate operation and determine whether he needs to clean same.

While the invention has been described with respect to a limited number of embodiments, it will be appreciated that many variations, modifications, and other applications of the invention can be made within the scope of the appended claims.

The invention claimed is:

1. A protein skimmer for fluid connection to a source of organic loaded water, the protein skimmer comprising an upright housing including an open topped body and a manually removable foam collection cup for sealing mounting on said body, said body having an inside surface, a bottom surface, a main inlet for sealing flow communication with the source of organic loaded water for providing an incoming flow of organic loaded water, a reaction chamber for foam fractionating said incoming flow of organic loaded water for forming organic free water, and a main outlet for providing an outgoing flow of organic free water, said foam collection cup having an uppermost rim and encircling an upright generally cylindrical foam collection duct having an interior surface, an exterior surface, an uppermost rim beneath said foam collection cup's uppermost rim, and a lowermost rim, said foam collection duct being in flow communication with said reaction chamber on sealing mounting said foam collection cup on said body whereby organic loaded foam spilling over said foam collection duct's uppermost rim slides down into said foam collection cup, said foam collection cup encircling said foam collection duct except for a recessed inspection window exposing an area of said foam collection duct's exterior surface thereby affording an aquarist a generally horizontal line of sight to inspect said foam collection duct's interior.

2. The skimmer as claimed in claim 1 wherein said inspection window has a top wall beneath said foam collection duct's uppermost rim whereby organic loaded foam spilling over said foam collection duct's uppermost rim in the region of said inspection window slides down onto said top wall and into said foam collection cup on either side of said inspection window.

3. The skimmer as claimed in claim 2 wherein said inspection window affords a view of about a quarter of said foam collection duct's exterior surface in a transverse cross section of said foam collection cup.

4. The skimmer as claimed in claim 1 wherein said foam collection duct has an uppermost annular spray ring with a plurality of spray holes for spraying water jets onto said foam collection duct's interior surface and further comprising a control valve for selectively diverting said incoming flow of organic loaded water from said reaction chamber to said spray ring.

5. The skimmer as claimed in claim 4 wherein said spray ring sprays chord-like water jets in a top view of said foam collection duct for setting up a downwardly spiraling flow of organic loaded water for cleaning said foam collection duct's interior surface.

6. The skimmer as claimed in claim 5 wherein each spray hole sprays a chord-like water jet towards its neighboring spray hole.

7. The skimmer as claimed in claim 4 wherein said spray ring is removably mounted on said foam collection duct.

8. The skimmer as claimed in claim 1 wherein said body includes a disperser deployed under said foam collection cup and acting as said reaction chamber's top surface, said disperser having a hollow upwardly converging surround with an uppermost central throat and a lowermost rim, said disperser's uppermost central throat being in sealing flow communication with said foam collection duct's lowermost rim on mounting said foam collection cup on said body, said disperser's lowermost rim being spaced apart from said body's inside surface whereby said disperser substantially uniformly disperses said incoming flow of organic loaded water flowing downwards between said disperser's lowermost rim and said body's inside surface into said reaction chamber.

9. The skimmer as claimed in claim 8 and further comprising a stand deployed above said bottom surface and acting as said reaction chamber's bottom surface, said stand having a top surface and a peripheral surface spaced apart from said body's inside surface, and said main outlet is in flow communication with an exit pipe having an inlet port beneath said stand whereby organic free water flows downwards between said peripheral surface and said body's inside surface into said exit pipe.

10. The skimmer as claimed in claim 9 and further comprising at least one aspirating pump with an inlet port for drawing water from said reaction chamber and an outlet port for returning an air/water mixture to said reaction chamber for circulating organic loaded water in said reaction chamber.

11. The skimmer as claimed in claim 1 wherein said body has opposite front and rear surfaces and opposite left and right side surfaces defining a generally rectangular transverse cross section, and said front surface includes a control panel having said main inlet, said main outlet, an outlet flow regulator for regulating said outgoing flow of organic free water, and at least one aspirating pump with an inlet port for drawing water from said reaction chamber and an outlet port for returning an air/water mixture to said reaction chamber.

12. The skimmer as claimed in claim 11 and further comprising a pair of latches for latching said foam collection cup on said body.

13. A protein skimmer for fluid connection to a source of organic loaded water, the protein skimmer comprising an upright housing including an open topped body and a manually removable foam collection cup for sealing mounting on said body, said body having an inside surface, a bottom surface, a main inlet for sealing flow communication with the source of organic loaded water for providing an incoming flow of organic loaded water, a reaction chamber for foam fractionating said incoming flow of organic loaded water for forming organic free water, and a main outlet for providing an outgoing flow of organic free water, said foam collection cup having an uppermost rim and encircling an upright generally cylindrical foam collection duct having an interior surface, an exterior surface, an uppermost rim beneath said foam collection cup's uppermost rim, and a lowermost rim, said foam collection duct being in flow communication with said reaction chamber on sealing mounting said foam collection cup on said body whereby organic loaded foam spilling over said foam collection duct's uppermost rim slides down into said foam collection cup, said foam collection duct having an uppermost annular spray ring with a plurality of spray holes for spraying water jets onto said foam collection duct's interior surface and a control valve for selectively diverting said incoming flow of organic loaded water from said reaction chamber to said spray ring, wherein said foam collection cup encircles said foam collection duct except for a recessed inspection window exposing an area of said foam collection duct's exterior surface thereby affording an aquarist a generally horizontal line of sight to inspect said foam collection duct's interior.

14. The skimmer as claimed in claim 13 wherein said spray ring sprays chord-like water jets in a top view of said foam collection duct for setting up a downwardly spiraling flow of organic loaded water for cleaning said foam collection duct's interior surface.

15. The skimmer as claimed in claim 14 wherein each spray hole sprays a chord-like water jet towards its neighboring spray hole.

16. The skimmer as claimed in claim 13 wherein said spray ring is removably mounted on said foam collection duct.

17. The skimmer as claimed in claim 13 wherein said inspection window has a top wall beneath said foam collection duct's uppermost rim whereby organic loaded foam spilling over said foam collection duct's uppermost rim in the region of said inspection window slides down onto said top wall and into said foam collection cup on either side of said inspection window.

18. The skimmer as claimed in claim 17 wherein said inspection window affords a view of about a quarter of said foam collection duct's exterior surface in a transverse cross section of said foam collection cup.

19. The skimmer as claimed in claim 13 wherein said body includes a disperser deployed under said foam collection cup and acting as said reaction chamber's top surface, said disperser having a hollow upwardly converging surround with an uppermost central throat and a lowermost rim, said disperser's uppermost central throat being in sealing flow communication with said foam collection duct's lowermost rim on mounting said foam collection cup on said body, said disperser's lowermost rim being spaced apart from said body's inside surface whereby said disperser substantially uniformly disperses said incoming flow of organic loaded water flowing downwards between said disperser's lowermost rim and said body's inside surface into said reaction chamber.

20. The skimmer as claimed in claim 19 and further comprising a stand deployed above said bottom surface and acting as said reaction chamber's bottom surface, said stand having a top surface and a peripheral surface spaced apart from said body's inside surface, and said main outlet is in flow communication with an exit pipe having an inlet port beneath said stand whereby organic free water flows downwards between said peripheral surface and said body's inside surface into said exit pipe.

21. The skimmer as claimed in claim 20 and further comprising at least one aspirating pump with an inlet port for drawing water from said reaction chamber and an outlet port for returning an air/water mixture to said reaction chamber for circulating organic loaded water in said reaction chamber.

22. The skimmer as claimed in claim 13 wherein said body has opposite front and rear surfaces and opposite left and right side surfaces defining a generally rectangular transverse cross section, and said front surface includes a control panel having said main inlet, said main outlet, an outlet flow regulator for regulating said outgoing flow of organic free water, and at least one aspirating pump with an inlet port for drawing water from said reaction chamber and an outlet port for returning an air/water mixture to said reaction chamber.

23. The skimmer as claimed in claim 22 and further comprising a pair of latches for latching said foam collection cup on said body.

24. A protein skimmer for fluid connection to a source of organic loaded water, the protein skimmer comprising an upright housing including an open topped body and a manually removable foam collection cup for sealing mounting on said body,
    said body having an inside surface, a bottom surface, a main inlet for sealing flow communication with the source of organic loaded water for providing an incoming flow of organic loaded water, a reaction chamber for foam fractionating said incoming flow of organic loaded water for forming organic free water, and a main outlet for providing an outgoing flow of organic free water,
    said foam collection cup having an uppermost rim and encircling an upright generally cylindrical foam collection duct having an interior surface, an exterior surface, an uppermost rim beneath said foam collection cup's uppermost rim, and a lowermost rim,
    said foam collection duct being in flow communication with said reaction chamber on sealing mounting said foam collection cup on said body whereby organic loaded foam spilling over said foam collection duct's uppermost rim slides down into said foam collection cup,
    said body including a disperser deployed under said foam collection cup and acting as said reaction chamber's top surface, said disperser having a hollow upwardly converging surround with an uppermost central throat and a lowermost rim, said disperser's uppermost central throat being in sealing flow communication with said foam collection duct's lowermost rim on mounting said foam collection cup on said body, said disperser's lowermost rim being spaced apart from said body's inside surface whereby said disperser substantially uniformly disperses said incoming flow of organic loaded water flowing downwards between said disperser's lowermost rim and said body's inside surface into said reaction chamber.

25. The skimmer as claimed in claim 24 and further comprising a stand deployed above said bottom surface and acting as said reaction chamber's bottom surface, said stand having a top surface and a peripheral surface spaced apart from said body's inside surface, and said main outlet is in flow communication with an exit pipe having an inlet port beneath said stand whereby organic free water flows downwards between said peripheral surface and said body's inside surface into said exit pipe.

26. The skimmer as claimed in claim 25 and further comprising at least one aspirating pump with an inlet port for drawing water from said reaction chamber and an outlet port for returning an air/water mixture to said reaction chamber for circulating organic loaded water in said reaction chamber.

27. The skimmer as claimed in claim 24 wherein said foam collection cup encircles said foam collection duct except for a recessed inspection window exposing an area of said foam collection duct's exterior surface thereby affording an aquarist a generally horizontal line of sight to inspect said foam collection duct's interior.

28. The skimmer as claimed in claim 27 wherein said inspection window has a top wall beneath said foam collection duct's uppermost rim whereby organic loaded foam spilling over said foam collection duct's uppermost rim in the region of said inspection window slides down onto said top wall and into said foam collection cup on either side of said inspection window.

29. The skimmer as claimed in claim 28 wherein said inspection window affords a view of about a quarter of said foam collection duct's exterior surface in a transverse cross section of said foam collection cup.

30. The skimmer as claimed in claim 24 wherein said foam collection duct has an uppermost annular spray ring with a plurality of spray holes for spraying water jets onto said foam collection duct's interior surface and further comprising a control valve for selectively diverting said incoming flow of organic loaded water from said reaction chamber to said spray ring.

31. The skimmer as claimed in claim 30 wherein said spray ring sprays chord-like water jets in a top view of said foam collection duct for setting up a downwardly spiraling flow of organic loaded water for cleaning said foam collection duct's interior surface.

32. The skimmer as claimed in claim 31 wherein each spray hole sprays a chord-like water jet towards its neighboring spray hole.

33. The skimmer as claimed in claim 30 wherein said spray ring is removably mounted on said foam collection duct.

34. The skimmer as claimed in claim 24 wherein said body has opposite front and rear surfaces and opposite left and right side surfaces defining a generally rectangular transverse cross section, and said front surface includes a control panel having said main inlet, said main outlet, an outlet flow regulator for regulating said outgoing flow of organic free water, and at least one aspirating pump with an inlet port for drawing water from said reaction chamber and an outlet port for returning an air/water mixture to said reaction chamber.

35. The skimmer as claimed in claim 34 and further comprising a pair of latches for latching said foam collection cup on said body.

36. A protein skimmer for fluid connection to a source of organic loaded water, the protein skimmer comprising an upright housing including an open topped body and a manually removable foam collection cup for sealing mounting on said body,
    said body having opposite front and rear surfaces and opposite left and right side surfaces defining a generally rectangular transverse cross section, an inside surface, a bottom surface, a main inlet for sealing flow communication with the source of organic loaded water for providing an incoming flow of organic loaded water, a reaction chamber for foam fractionating said incoming flow of organic loaded water for forming organic free water, and a main outlet for providing an outgoing flow of organic free water,
    said foam collection cup having an uppermost rim and encircling an upright generally cylindrical foam collection duct having an interior surface, an exterior surface, an uppermost rim beneath said foam collection cup's uppermost rim, and a lowermost rim,
    said foam collection duct being in flow communication with said reaction chamber on sealing mounting said foam collection cup on said body whereby organic loaded foam spilling over said foam collection duct's uppermost rim slides down into said foam collection cup,
    said front surface including a control panel having said main inlet, said main outlet, an outlet flow regulator for regulating said outgoing flow of organic free water, and at least one aspirating pump with an inlet port for drawing water from said reaction chamber and an outlet port for returning an air/water mixture to said reaction chamber.

37. The skimmer as claimed in claim 36 and further comprising a pair of latches for latching said foam collection cup on said body.

38. The skimmer as claimed in claim 36 wherein said foam collection cup encircles said foam collection duct except for a recessed inspection window exposing an area of said foam collection duct's exterior surface thereby affording an aquarist a generally horizontal line of sight to inspect said foam collection duct's interior.

39. The skimmer as claimed in claim 38 wherein said inspection window has a top wall beneath said foam collection duct's uppermost rim whereby organic loaded foam spilling over said foam collection duct's uppermost rim in the region of said inspection window slides down onto said top wall and into said foam collection cup on either side of said inspection window.

40. The skimmer as claimed in claim 39 wherein said inspection window affords a view of about a quarter of said foam collection duct's exterior surface in a transverse cross section of said foam collection cup.

41. The skimmer as claimed in claim 36 wherein said foam collection duct has an uppermost annular spray ring with a plurality of spray holes for spraying water jets onto said foam collection duct's interior surface and further comprising a control valve for selectively diverting said incoming flow of organic loaded water from said reaction chamber to said spray ring.

42. The skimmer as claimed in claim 41 wherein said spray ring sprays chord-like water jets in a top view of said foam collection duct for setting up a downwardly spiraling flow of organic loaded water for cleaning said foam collection duct's interior surface.

43. The skimmer as claimed in claim 42 wherein each spray hole sprays a chord-like water jet towards its neighboring spray hole.

44. The skimmer as claimed in claim 41 wherein said spray ring is removably mounted on said foam collection duct.

45. The skimmer as claimed in claim 36 wherein said body includes a disperser deployed under said foam collection cup and acting as said reaction chamber's top surface, said disperser having a hollow upwardly converging surround with an uppermost central throat and a lowermost rim, said disperser's uppermost central throat being in sealing flow communication with said foam collection duct's lowermost rim on mounting said foam collection cup on said body, said disperser's lowermost rim being spaced apart from said body's inside surface whereby said disperser substantially uniformly disperses said incoming flow of organic loaded water flowing downwards between said disperser's lowermost rim and said body's inside surface into said reaction chamber.

46. The skimmer as claimed in claim 45 and further comprising a stand deployed above said bottom surface and acting as said reaction chamber's bottom surface, said stand having a top surface and a peripheral surface spaced apart from said body's inside surface, and said main outlet is in flow communication with an exit pipe having an inlet port beneath said stand whereby organic free water flows downwards between said peripheral surface and said body's inside surface into said exit pipe.

* * * * *